Dec. 9, 1958
H. S. PREISER
2,863,819
INSOLUBLE TRAILING ANODE FOR CATHODIC
PROTECTION OF SHIPS
Filed Aug. 25, 1955
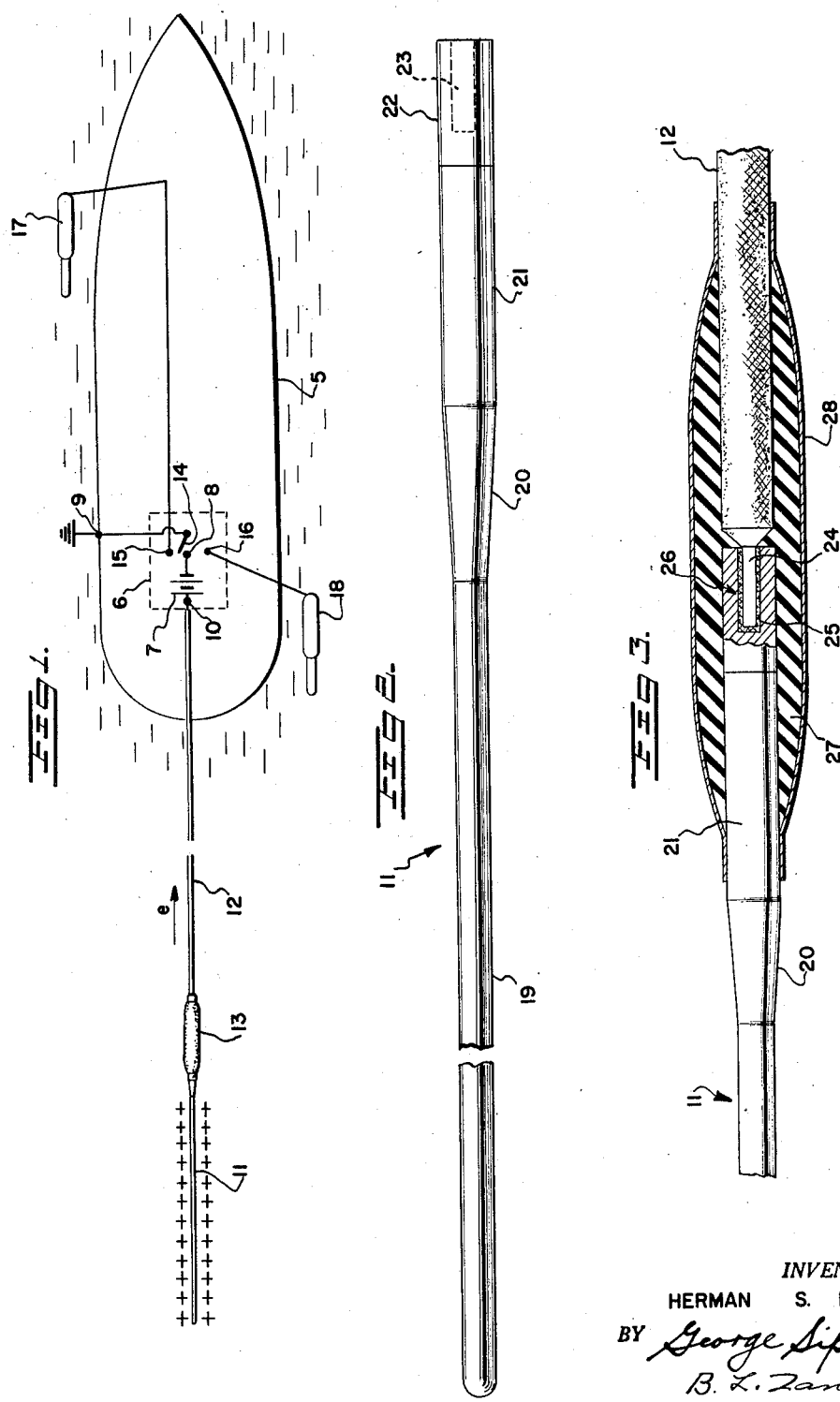
INVENTOR.
HERMAN S. PREISER
BY George Sipkin
B. L. Zangwill
ATTORNEYS

United States Patent Office 2,863,819
Patented Dec. 9, 1958

2,863,819

INSOLUBLE TRAILING ANODE FOR CATHODIC PROTECTION OF SHIPS

Herman S. Preiser, Washington, D. C.

Application August 25, 1955, Serial No. 530,647

2 Claims. (Cl. 204—196)

(Granted under Title 35, U. S. Code (1952), sec. 266)

The invention described herein may be manufactured and used by or for the Government of the United States of America for governmental purposes without the payment of any royalties thereon or therefor.

The invention relates to a method and means for protecting ships' hulls against corrosion; more particularly to cathodic protection thereof, and specifically to an insoluble trailing electrode for the cathodic protection of a ship's hull exposed to sea water.

Corrosion of hulls exposed to sea water is due to galvanic action which involves the generation of an electric potential between two metals or between different sections of a metal having different oxidation reduction potentials. The metal which becomes more corroded has a lower oxidation reduction potential and is referred to as anodic or the least noble in the electrochemical series and the metal which is less corroded and has a higher oxidation reduction potential is referred to as cathodic or more noble, e. g. in an ordinary galvanic battery cell zinc is the more corroded and is less noble while the copper is more noble and the least corroded of the two.

Heretofore cathodic protection involved either coupling a ship's hull exposed to sea water with a metal more anodic (lower oxidation reduction potential) or to raise the oxidation reduction potential of the hull with respect to a metal less anodic than the hull by impressing a current on the auxiliary anodes.

In the former method the more anodic metal or the one with the lower oxidation reduction potential is sacrificed or consumed to protect the ship's hull from corrosion while in the latter method, the hull and metal are serially connected through the sea water electrolyte with a D. C. current source such that current is drawn by the ship's hull at such a rate that polarization occurs at the ship's hull. Polarization is in effect the blocking of an electrode surface (ship's hull) from the electrolyte by the formation of hydrogen which adheres to the surface of the hull. This formation of hydrogen at the ship's hull (cathode) results in an increase of the pH of the water film immediately adjacent the hull resulting in a predominantly calcium carbonate precipitate on the hull which is relatively permanent due to the low solubility of $CaCO_3$ in sea water. The time required for coating the ship's hull is a function of current density.

Both of these methods, i. e. sacrificial anode and D. C. energized anode systems involved mounting cumbersome and heavy anodes close to the hull, such as zinc or magnesium in the sacrificial anode systems, or steel and graphite on the underwater exterior of the hull in the energized systems. Sacrificial or consumable anodes suffered the disadvantages of increased drag on the ship, they had to be replaced periodically necessitating dry-docking for removal and installation which increased costs, and with magnesium electrodes special painting was required. In addition to these enumerated disadvantages the energized anode systems or impressed current anode systems required careful current regulation, special wiring, dielectric shielding around the anodes and more important it was very difficult to achieve current distribution about the hull whereby it was made cathodic with the anode close to the hull.

This invention overcomes the disadvantages supra by utilizing an insoluble anode of negligible resistance properly connected to a D. C. source and by trailing it behind a ship to be cathodically protected at a predetermined distance to insure uniform current distribution throughout the ship's hull.

An object of this invention is to provide a simple and effective method of reducing underwater corrosion of a ship hull.

Another object of this invention is the provision of a light-weight, electrochemically inert insoluble low resistance anode for cathodic protection of ships' hulls.

Another object is to provide a permanent insoluble anode for cathodic protection of ship hulls which is easily and inexpensively serviced should the necessity arise.

Other objects and many of the attendant advantages of this invention will be readily appreciated as the same becomes better understood by reference to the following detailed description when considered in connection with the accompanying drawings wherein:

Fig. 1 is a diagrammatic showing of the electrode in operation attached to a ship;

Fig. 2 is a full scale perspective view of a platinum-clad anode; and

Fig. 3 is a cross-sectional view of the sealed connection of the anode to a cable.

Referring now to the drawings wherein like reference characters designate like or corresponding parts throughout the several views, there is shown in Fig. 1 a ship 5 which is to be cathodically protected from corrosion carrying a D. C. power source and meter box 6; the power source being illustratively shown as a battery 7. The negative terminal 8 of the battery is grounded to the ship's hull as at 9 and the positive terminal 10 is connected to an insoluble anode 11 through a suitable length of flexible waterproof electrical cable 12 joined to the anode by a chemically resistant sealed joint 13. In the preferred embodiment, the cable was 200 feet long. With switch 14 on terminal 8, the anode 11, power source 7, and hull 5 form, with the sea water as an electrolyte, a complete circuit and the result of the connection will cause the anode to assume a positive polarity and the hull a negative polarity as shown. Terminals 15 and 16 are connected to forward and stern reference electrodes 17 and 18 composed of silver-silver chloride to which the hull 5 may be connected to measure its oxidation reduction potential after current has been applied thereto for a predetermined period of time and from time to time thereafter.

Referring now to Fig. 2, the anode in the preferred embodiment consists of a single coin silver rod about 4 feet in length and having a trailing end section 19 of about ¼ inch diameter, a flared section 20, and a coupling section 21. The rod is clad with platinum substantially along its entire length except for an exposed end portion 22 of section 21. Obviously other electrochemically insoluble materials such as a platinum-clad copper, solid platinum or other inert metal could be used to form the anode. The cladding is a commercial rolling process which bonds a pore-free minimum 0.005" layer of platinum or platinum alloy on the coin silver rod. The exposed silver end section 22 has a bore 23 formed therein adapted to receive the conductor 24 of the cable 12. The purpose of the flared section 20 is to reduce turbulence when the anode is drawn through the water and to streamline the anode.

Referring now to Fig. 3, the anode 11 is joined to a flexible rubber-covered waterproof electrical cable 12.

The bore 23 in the end section is provided to receive the conductor 24 of the cable wherein it is secured by silver solder 25 to form a solid joint or connection 26. The joint is surrounded by a molded rubber seal 27 which is in turn sheathed with an oxy-chlorine resistant material 28 such as certain polyester and epoxy resins or monochlorotrifluorethylene of polytetrafluorethylene compounds. For example, in the preferred embodiment epoxy resins such as "laminac," Shell epon 828 or Bakelite Company's C8 resins were found suitable. An example of suitable compounds of the aforementioned types that could be used are "Kel-F," Teflon or polyethylene. The sheath 28 is also molded around the anode 11 and cable 12 to either side of the soldered connection 26 to render it watertight and hence resistant to chemical attack. The weight per foot of the anode rod approximates the weight per foot of the cable conductor so that by careful design the anode is essentially an extension of the cable and will tow easily and straight without whipping or bobbing. Should the seas be rough the shape or weight could be modified to make it trail better; and should the lifting effect of speed on the cable become excessive, vanes and stabilizers may be added to the electrode to hold it down. The anode in the preferred embodiment was designed to have a low enough electrolytic resistance to remote ground to enable it to carry the full current requirement for the cathodic protection of an active vessel.

In operation the cable 12 and attached anode 11 is payed out over the stern of the ship 5 for at least 25 feet while underway and is preferably towed from about 100 to 200 feet behind. The positive terminal of a D. C. source of potential of predetermined magnitude is connected to the anode and the negative terminal to the ship's hull thereby rendering the anode the positive electrode and the hull the negative electrode. With the sea water acting as an electrolyte the flow of electrons $e$ to the negative electrode or ship's hull causes the reaction $2H_2O + 2e \rightarrow 2OH + H_2$ to take place. The current flowing is of sufficient magnitude such that the hydrogen evolved will adhere to the hull to thereby polarize it or raise the oxidation-reduction potential of the steel hull 5 to a protective value of about $-.8$ volt when referred to the silver-silver chloride reference electrodes 17 and 18. Polarization causes an increase in the pH of the water film immediately adjacent the hull which causes a predominantly $CaCO_3$ precipitate on the hull which further protects it from corrosive influences.

In a test of the preferred embodiment a current of 10 amps was circulated and raised in increments of 5 amps every two hours until a rise in hull potential as measured by the silver-silver chloride reference electrodes was noted. The current was held at that level and gradually reduced until a desired hull potential of $-.85$ volt was reached. After this initial polarization it was found that a current of only 4.2 amperes was required to maintain hull potential at $-.85$ volt when underway at 12 knots and only 2.1 amperes at dockside.

Recapitulating, this invention provides a lightweight insoluble trailing anode which contributes only negligible drag on a ship. The arrangement obviates the necessity of drydocking the ship for installation or inspection purposes, obviates the need for special paints, obviates critical current regulation and current distribution is readily accomplished.

Obviously many modifications and variations of the present invention are possible in the light of the above teachings. It is therefore to be understood that within the scope of the appended claims the invention may be practiced otherwise than as specifically described.

What is claimed is:

1. A cathodic protection system for preventing corrosion of ship hulls comprising a current source having a negative terminal connected to said hull and a positive terminal, an insulated electric cable having one end connected to said positive terminal and adapted to be trailed in the water behind said hull, a streamlined, electrochemically insoluble electrode rod connected to the trailing end of said cable having a weight per unit length equal to said cable whereby the electrode will trail smoothly through said water, and a streamlined, oxychlorine resistant insulating and sealing means molded around the connection between said electrode rod and said cable.

2. A cathodic protection system according to claim 1 but further characterized by said rod comprising coin silver having a pore-free platinum alloy coating.

References Cited in the file of this patent
UNITED STATES PATENTS 1,077,894    Stevens _____ Nov. 4, 1913

FOREIGN PATENTS 13,971    Great Britain _____ Sept. 5, 1890

OTHER REFERENCES

Humble: Corrosion, vol. 5, No. 9, pp. 292–300, September 1949.

McLeod: Water and Sewage Works, May 1949, vol. 96, No. 5, page 177.

Doremus et al.: Corrosion, vol. 6, No. 7, page 21.